(12) United States Patent
Tsuruga et al.

(10) Patent No.: US 12,032,164 B2
(45) Date of Patent: Jul. 9, 2024

(54) HEAD-MOUNT DISPLAY AND HEAD-MOUNT DISPLAY SYSTEM THAT DISPLAY VIRTUAL SPACE INFORMATION ON A DISPLAY

(71) Applicant: MAXELL, LTD., Kyoto (JP)

(72) Inventors: Sadao Tsuruga, Kyoto (JP); Yasunobu Hashimoto, Kyoto (JP); Kazuhiko Yoshizawa, Kyoto (JP); Yoshinori Okada, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/281,609

(22) PCT Filed: Oct. 3, 2018

(86) PCT No.: PCT/JP2018/037091
§ 371 (c)(1),
(2) Date: Mar. 31, 2021

(87) PCT Pub. No.: WO2020/070839
PCT Pub. Date: Apr. 9, 2020

(65) Prior Publication Data
US 2021/0389587 A1    Dec. 16, 2021

(51) Int. Cl.
*G09G 5/00* (2006.01)
*G02B 27/00* (2006.01)
*G02B 27/01* (2006.01)

(52) U.S. Cl.
CPC ..... *G02B 27/0172* (2013.01); *G02B 27/0093* (2013.01); *G02B 2027/0138* (2013.01); *G02B 2027/014* (2013.01)

(58) Field of Classification Search
CPC ........ G06F 3/01; G06F 3/0481; G06F 3/0484; G02B 2027/0138; G02B 2027/014; G02B 27/0093; G02B 27/017; G02B 27/0172
See application file for complete search history.

(56) References Cited

U.S. PATENT DOCUMENTS

| 2009/0040233 A1* | 2/2009 | Yamamoto | G06F 3/011 345/592 |
| 2013/0336629 A1* | 12/2013 | Mulholland | H04N 9/87 386/230 |

(Continued)

FOREIGN PATENT DOCUMENTS

| EP | 3398666 A1 | 11/2018 |
| JP | H11-249064 A | 9/1999 |

(Continued)

OTHER PUBLICATIONS

International Search Report of PCT/JP2018/037091 dated Nov. 6, 2018.

(Continued)

*Primary Examiner* — Jonathan M Blancha
(74) *Attorney, Agent, or Firm* — Mattingly & Malur, PC

(57) ABSTRACT

A head-mount display comprises a display and a controller. The controller is configured to: acquire a first sensor output outputted from an ambient monitoring sensor configured to monitor an ambient environment of the head-mount display to determine presence or absence of an abnormality in the ambient environment; acquire a second sensor output outputted from a condition monitoring sensor configured to monitor biometric information of a user wearing the head-mount display to determine presence or absence of a factor of decreasing attention due to a user's condition; determine the display mode at a time of displaying the virtual space information on the display based on both the presence or absence of the abnormality in the ambient environment and the factor of decreasing attention due to the user's condition; and display the virtual space information on the display in the determined display mode.

12 Claims, 7 Drawing Sheets

(56) References Cited

U.S. PATENT DOCUMENTS

| | | | |
|---|---|---|---|
| 2014/0320399 A1* | 10/2014 | Kim | G02B 27/017 |
| | | | 345/156 |
| 2015/0227196 A1 | 8/2015 | Fujii et al. | |
| 2016/0357491 A1 | 12/2016 | Oya | |
| 2017/0351328 A1* | 12/2017 | Perrin | G02B 27/017 |
| 2018/0173309 A1 | 6/2018 | Uchiyama et al. | |

FOREIGN PATENT DOCUMENTS

| | | |
|---|---|---|
| JP | 2014-038523 A | 4/2014 |
| JP | 2016-224810 A | 12/2016 |
| JP | 2017-119031 A1 | 7/2017 |
| WO | 2015/145863 A1 | 10/2015 |
| WO | 2016/157523 A1 | 10/2016 |
| WO | 2017/00640 A1 | 1/2017 |
| WO | 2018/005557 A1 | 1/2018 |

OTHER PUBLICATIONS

Japanese Office Action received in corresponding Japanese Application No. 2022-132869 dated Jun. 20, 2023.

* cited by examiner

HEAD-MOUNT DISPLAY AND HEAD-MOUNT DISPLAY SYSTEM THAT DISPLAY VIRTUAL SPACE INFORMATION ON A DISPLAY

TECHNICAL FIELD

The present invention relates to a head-mount display and a head-mount display system, and more particularly, to a display mode of virtual space information.

BACKGROUND ART

It has been known the technique for displaying virtual space information (virtual object) on a head-mount display mounted on the head of a user, and superimposing the virtual space information on the real space to make the user visually recognize the superimposed information. The head-mount display above allows the user to feel as if a virtual object exists at the place by seamlessly integrating the real world with the virtual world. With this technique, it has become possible for the user to obtain a deep sense of immersion which provides the user with an illusion that the virtual world is the real world. However, on the other hand, there has been a problem that the user cannot easily identify or distinguish between the virtual world and the real world due to the deep sense of immersion.

To solve this problem, Patent Literature 1 discloses that "a feedback decision unit is configured to, on a basis of a user state of a user who is experiencing a world in which information at least partially including a virtual object is provided, decide feedback for the user".

CITATION LIST

Patent Literature

Patent Literature 1: WO2017/006640

SUMMARY OF INVENTION

Technical Problem

For a user wearing the head-mount display, the attention required to recognize the virtual space and the real space differs depending on a using state the head-mount display. For example, in a static state in a space where everyday life is spent, even if the user incorrectly recognizes a virtual object, for example, a cup or a vase displayed virtually on a table, as a real object, it does not present a serious problem to a user. On the other hand, in the case where the user uses the head-mount display while walking outdoors, if a sidewalk having no obstacle and spreading widely is virtually displayed although a left bicycle exists beside the real sidewalk, there is a fear that the user stumbles over the left bicycle as a result of incorrectly recognizing the virtual space as the real space.

As described above, there is a circumstance where the user's attention required to avoid misrecognition between the real space and the virtual space is relatively determined not only in accordance with the user's inherent attention but also the ambient environment condition. In this regard, in Patent Literature 1, only the user's condition is monitored but the user's ambient environment is not considered.

The present invention has been made in view of the circumstance above, and an object of the present invention is to provide a head-mount display and a head-mount display system which provide a user with a warning for incorrect recognition of a virtual space as a real space.

Solution to Problem

In order to solve the problem above, the present invention includes the technical features recited in the scope of claims. According to one example of the present invention, a head-mount display comprises: a display that displays virtual space information; and a controller connected to the display, which is configured to determine a display mode for displaying the virtual space information on the display, wherein the controller is further configured to: acquire a first sensor output outputted from an ambient monitoring sensor configured to monitor an ambient environment of the head-mount display to determine presence or absence of an abnormality in the ambient environment; acquire a second sensor output outputted from a condition monitoring sensor configured to monitor biometric information of a user wearing the head-mount display to determine presence or absence of a factor of decreasing attention due to a user's condition; determine the display mode at a time of displaying the virtual space information on the display based on both the presence or absence of the abnormality in the ambient environment and the factor of decreasing attention due to the user's condition; and display the virtual space information on the display in the display mode as determined.

Advantageous Effects of Invention

According to the present invention, it is possible to provide a head-mount display and a head-mount display system which provide a user with a warning for incorrect recognition of a virtual space as a real space. The problems, configurations, and effects other than those described above will be clarified by explanation of the embodiments below.

DESCRIPTION OF EMBODIMENTS

Hereinafter, an embodiment of the present invention will be described with reference to the drawings. Throughout the drawings, the same components and processes are provided with the same reference signs and repetitive explanation thereof will be omitted.

Figure 1:
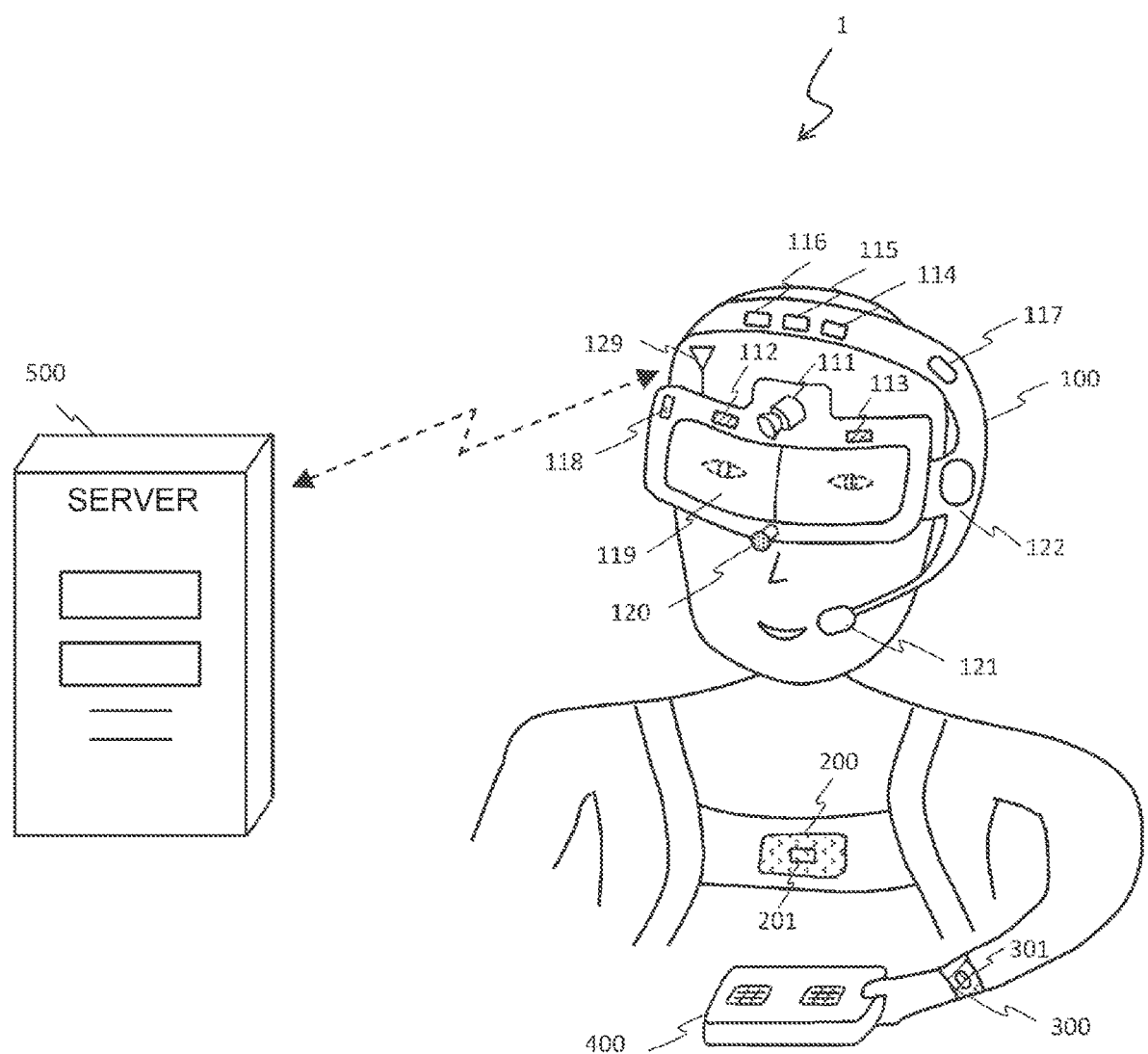
FIG. 1 is a schematic diagram of appearance of a head-mount display system according to the present embodiment.

FIG. 1 is a schematic view of appearance of an HMD system 1 (HMD: Head-Mount Display) according to the present embodiment. In FIG. 1, the HMD system 1 includes an HMD 100 worn on the user's head, a first wearable terminal 200 (chest wearable terminal) worn on the user's chest, a second wearable terminal 300 (wristband type wearable terminal) worn on the user's arm, and an input controller 400. Each of the first wearable terminal 200, the second wearable terminal 300, and the input controller 400 is connected to the HMD 100 by near field wireless communication to perform transmission and reception of data. Meanwhile, transmission and reception of data may be performed by wired communication.

A server 500 generates virtual space information and transmits it to the HMD 100 through a wireless communication line. Meanwhile, the HMD 100 may be configured to generate and display the virtual space information by itself.

The HMD 100 includes a camera 111, a line-of-sight sensor 112 for right eye, a line-of-sight sensor 113 for left eye, an acceleration sensor 114, a gyro sensor 115, a geomagnetic sensor 116, a temperature and humidity sensor 117, and an ambient monitoring sensor 118 to detect a user's forward image (including an image of a surrounding object), a user's line of sight, movement of the user's head, and the ambient temperature and humidity.

Furthermore, the HMD 100 includes a display 119 installed in front of both eyes to display an image of real space information captured by the camera 111 and an image 130 of the virtual space information generated by the server 500.

The HMD 100 includes an ambient sound microphone 120 and a voice microphone 121 to collect external sounds and voices of the user himself or herself.

The HMD 100 includes a headphone 122 which is arranged near the user's ear to output sounds and music thereto.

The HMD 100 further includes an antenna 129 to transmit and receive information to and from the server 500 through an external network 600. The HMD 100 receives the virtual space information generated by the server 500 and displays it on the display 119.

The camera 111 has a function as a sensor for detecting an ambient condition around a user, and in the case of using the camera 111 for detecting a user's line of sight, has a function as a sensor for detecting a user's condition. Each of the line-of-sight sensor 112 for right eye, the line-of-sight sensor 113 for left eye, the acceleration sensor 114, and the gyro sensor 115 corresponds to a condition monitoring sensor.

The first wearable terminal 200 includes a heartbeat sensor 201 to detect a heart rate which is the number of heart beats within a predetermined time.

The second wearable terminal 300 includes a blood pressure sensor 301 to detect the user's blood pressure. In this connection, the second wearable terminal 300 may include a pulse sensor to detect a pulse rate which is the arterial pulsation frequency.

Each of the first wearable terminal 200 and the second wearable terminal 300 corresponds to a user's condition monitoring sensor.

The input controller 400 is provided for a user to perform various input operations. Based on a user input operation received by the input controller 400, on the display 119 provided in front of both eyes of the user, the image 130 of the virtual space information generated by the server 500 or the image 130 of the virtual space information generated by the HMD 100 is superimposed on the real space information, or the real space information is replaced with the virtual space information.

The technical features of the HMD 100 according to the present embodiment can be found in that a user's physical condition and an ambient condition around the user are detected by various sensors provided in each of the HMD 100 worn by the user, the first wearable terminal 200, and the second wearable terminal 300 so as to change a display mode of the image 130 of the virtual space information to be displayed on the display 119 based on the both conditions. The display mode includes a normal display mode in the case where both the user's physical condition and the ambient condition are normal, and a specific display mode in the case where at least one of the user's physical condition and the ambient condition is abnormal, which is a display mode different from the normal display mode. In the present specification, non-display is included as one of the aspects of specific display mode. The details thereof will be described later.

Figure 2:
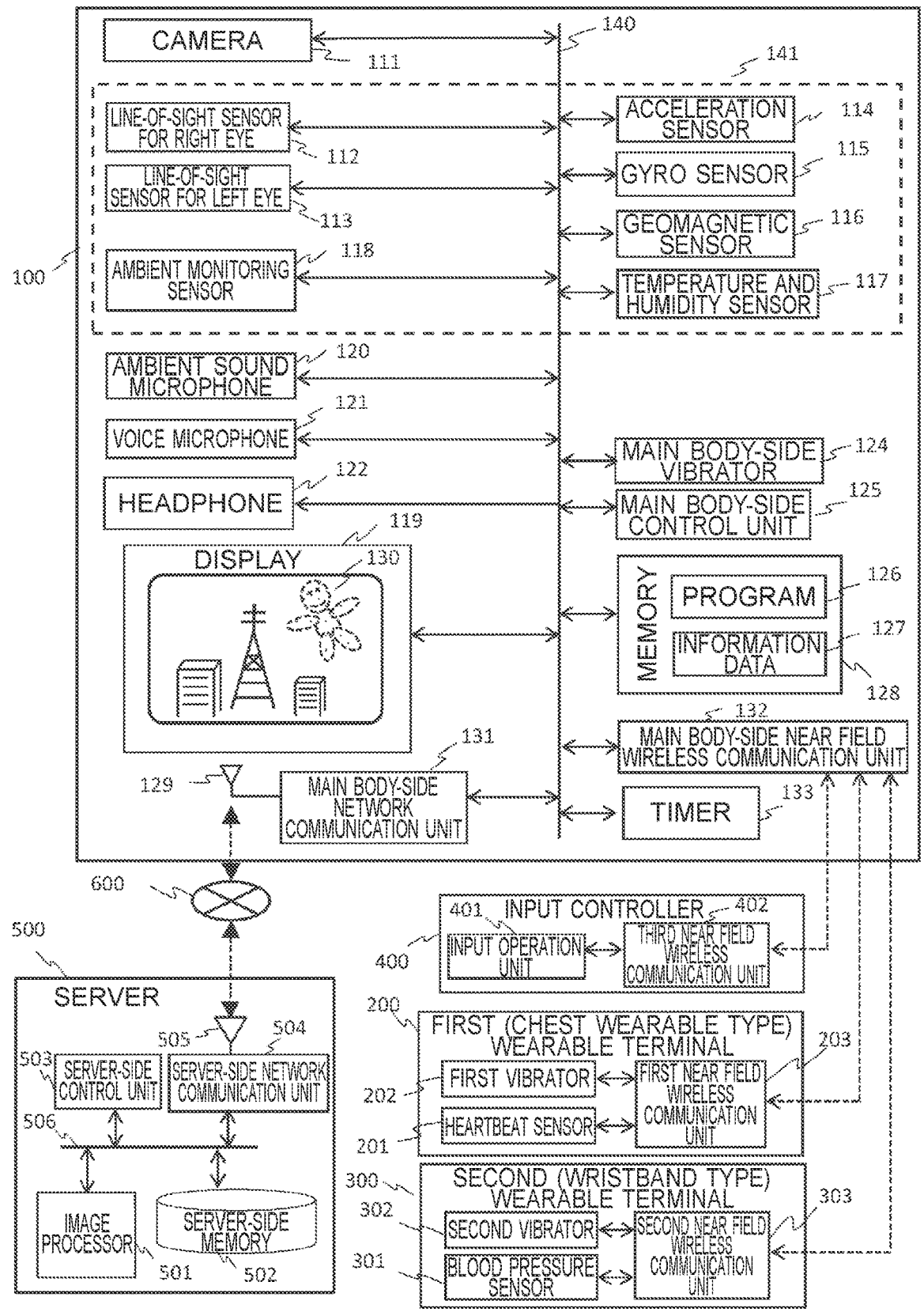
FIG. 2 is a block diagram of a configuration example of the head-mount display system illustrated in FIG. 1.

FIG. 2 is a block diagram of a configuration example of the HMD system 1 illustrated in FIG. 1.

In FIG. 2, the HMD 100 includes the camera 111, the line-of-sight sensor 112 for right eye, the line-of-sight sensor 113 for left eye, the acceleration sensor 114, the gyro sensor 115, the geomagnetic sensor 116, the temperature and humidity sensor 117, the ambient monitoring sensor 118, the display 119, the ambient sound microphone 120, the voice microphone 121, the headphone 122, a main body-side vibrator 124, a main body-side control unit 125, a memory 128 storing such as programs 126 and information data 127, the antenna 129, a main body-side network communication unit 131, a main body-side near field wireless communication unit 132 (corresponding to a main body-side communication unit), and a timer 133. Each of these components, except for the antenna 129, is mutually connected via a bus 140.

The camera 111 is installed in front of the HMD 100 to capture a scenery in front of the user. The captured image is displayed on an immersive display 119 as an image of the real space. In the case where the display 119 is a transmissive display, since the user only needs to view the real space information with his or her own eyes, the image captured by the camera 111 does not need to be displayed on the display 119.

The line-of-sight sensor 112 for right eye is configured to detect the line of sight of the right eye, and the line-of-sight sensor 113 for left eye is configured to detect the line of sight of the left eye. For the processing of detecting the lines of sight, a well-known technique commonly used as eye tracking processing may be employed. For example, as the processing employing corneal reflection, there has been known a technique for irradiating infrared LED (Light Emitting Diode) to capture an image of the face by an infrared camera, and detecting the line of sight detected based on the position of the pupil with respect to the position of the corneal reflection by using the position on the cornea of the reflected light (corneal reflection) generated by the infrared LED irradiation as a reference point.

The acceleration sensor 114 is a sensor configured to detect the acceleration which indicates the change in velocity per second, and can capture movement, vibration, impact, and the like.

The gyro sensor 115 is a sensor configured to detect the angular velocity of the rotation directions, and can capture each state of posture in the vertical, horizontal, and oblique directions. By using the acceleration sensor 114 and the gyro sensor 115 mounted on the HMD 100, it is possible to detect the movement of the user's head wearing the HMD 100.

The geomagnetic sensor 116 is a sensor configured to detect the magnetic force of the earth to detect the direction in which the HMD 100 is facing. As the geomagnetic sensor 116, a three-axis type geomagnetic sensor for detecting the geomagnetism in the vertical direction in addition to the longitudinal and lateral directions may be used to capture the geomagnetic change with respect to the movement of the head so as to capture the movement of the head. With the sensors above, it is possible to detect in detail the change in the movement of the user's head wearing the HMD 100.

The temperature and humidity sensor 117 is a sensor configured to detect the temperature and humidity around the user.

The ambient monitoring sensor 118 is a sensor configured to emit radio waves, light waves, ultrasonic waves, etc. and capture the reflected waves so as to detect a distance and a direction to the reflected object. The ambient monitoring sensor 118 is to be mounted on the user's head, and can detect a distance and a direction to an object around the user. In this connection, a portion 141 surrounded by a dotted line indicates various sensor devices.

The main body-side control unit 125 constitutes a controller of the HMD 100, and is configured by using a processor that executes the programs 126 such as an OS (Operating System) and an application software for operation control stored in the memory 128, and a circuit that realizes functions equivalent to those of the programs 126. The main body-side control unit 125 controls the components of the HMD 100, and performs operation control processing of the entire HMD 100.

The main body-side control unit 125 controls, depending on presence or absence of an abnormality in an ambient condition and a user's condition, operations of superimposing the virtual space information on the real space information to display the superimposed information on the display 119, or replacing the real space information with the virtual space information to display the replaced information on the display 119.

Based on the information detected by the various sensor devices, the main body-side control unit 125 identifies and determines whether the user's physical condition is an abnormal condition in which the virtual space information is incorrectly recognized as the real space information by the user, as well as identifies and determines whether a user's ambient condition is an abnormal condition which is dangerous to the user upon displaying the virtual space information.

Furthermore, the main body-side control unit 125 switches, to a normal display mode or a specific display mode, a display mode for displaying the information on the display 119 by superimposing the virtual space information on the real space information or by replacing the real space information with the virtual space information when determining that the user's attention is decreased and in the abnormal condition in which the virtual space information is incorrectly recognized as the real space information by the user.

Still further, the main body-side control unit 125 switches, from a normal display mode to the specific display mode or a non-display mode, the display mode for displaying the information on the display 119 by superimposing the virtual space information on the real space information or by replacing the real space information with the virtual space information when determining presence of the abnormal condition that is dangerous to the user, in which an object around the user is detected and the detected object approaches within a certain range of the user and is about to collide with the virtual space information display, that is, when determining that there is an abnormality around the user.

The memory 128 is a flash memory or the like, and stores, in addition to the various programs 126 used by the main body-side control unit 125, information data 127 such as the virtual space information transmitted from the server 500, a first sensor output received from the first wearable terminal 200, and a second sensor output received from the second wearable terminal 300.

The display 119 is configured by a liquid crystal panel or the like, and displays the image 130 of the real space information and the virtual space information, and also displays the presentation notification information to the user and the display contents of the operation state on a screen. For example, as illustrated in FIG. 2, the image 130 of the virtual space information generated by the server 500 and transmitted to the HMD 100 is superposed on the image of the real space information captured by the camera 111, and the superimposed image is displayed on the screen of the display 119.

The main body-side vibrator 124 is configured to generate vibration such that the main body-side control unit 125 controls to convert notification information to the user transmitted from the HMD 100 into vibration. By generating vibration at the user's head where the HMD is closely worn, the main body-side vibrator 124 can reliably transmit a notification to the user.

The main body-side network communication unit 131 is a communication interface for communicating with the external server 500 by a wireless LAN, a wired LAN, or base station communication. For performing wireless communication, the main body-side network communication unit 131 is connected to the external network 600 via the antenna 129 to transmit and receive information therebetween. The main body-side network communication unit 131 can receive the virtual space information generated by the server 500 via the external network 600 or the like, and can transmit and receive operation control signal information or the like to and from the server 500. As a base station communication system, a long distance wireless communication such as W-CDMA (Wideband Code Division Multiple Access or GSM (Global System for Mobile communications) (registered trademark) may be employed.

The main body-side near field wireless communication unit 132 is a communication interface for performing near field wireless communication with each of the first wearable terminal 200, the second wearable terminal 300, and the input controller 400 which are in a range available for near field wireless communication. The main body-side near field wireless communication unit 132 may perform the near field wireless communication by using, for example, an electronic tag. Meanwhile, the Bluetooth (registered trademark), IrDA (Infrared Data Association), Zigbee (registered trademark), HomeRF (Home Radio Frequency, registered trademark), or a wireless LAN (IEEE802.11a, IEEE802.11b, IEEE802.11g) may be employed as long as at least it can perform the near field wireless communication when the HMD 100 is positioned near the first wearable terminal 200, the second wearable terminal 300, and the input controller 400.

The first wearable terminal 200 includes the heartbeat sensor 201, a first vibrator 202, and a first near field wireless communication unit 203 (corresponding to a terminal-side communication unit). The heartbeat sensor 201 is mounted closely to the user's chest to detect the user's heart rate with high accuracy. The first near field wireless communication unit 203 transmits the detected heart rate information to the HMD 100 by near field wireless communication. At the HMD 100 side, the main body-side near field wireless communication unit 132 receives and acquires the transmitted heart rate information.

Figure 3:
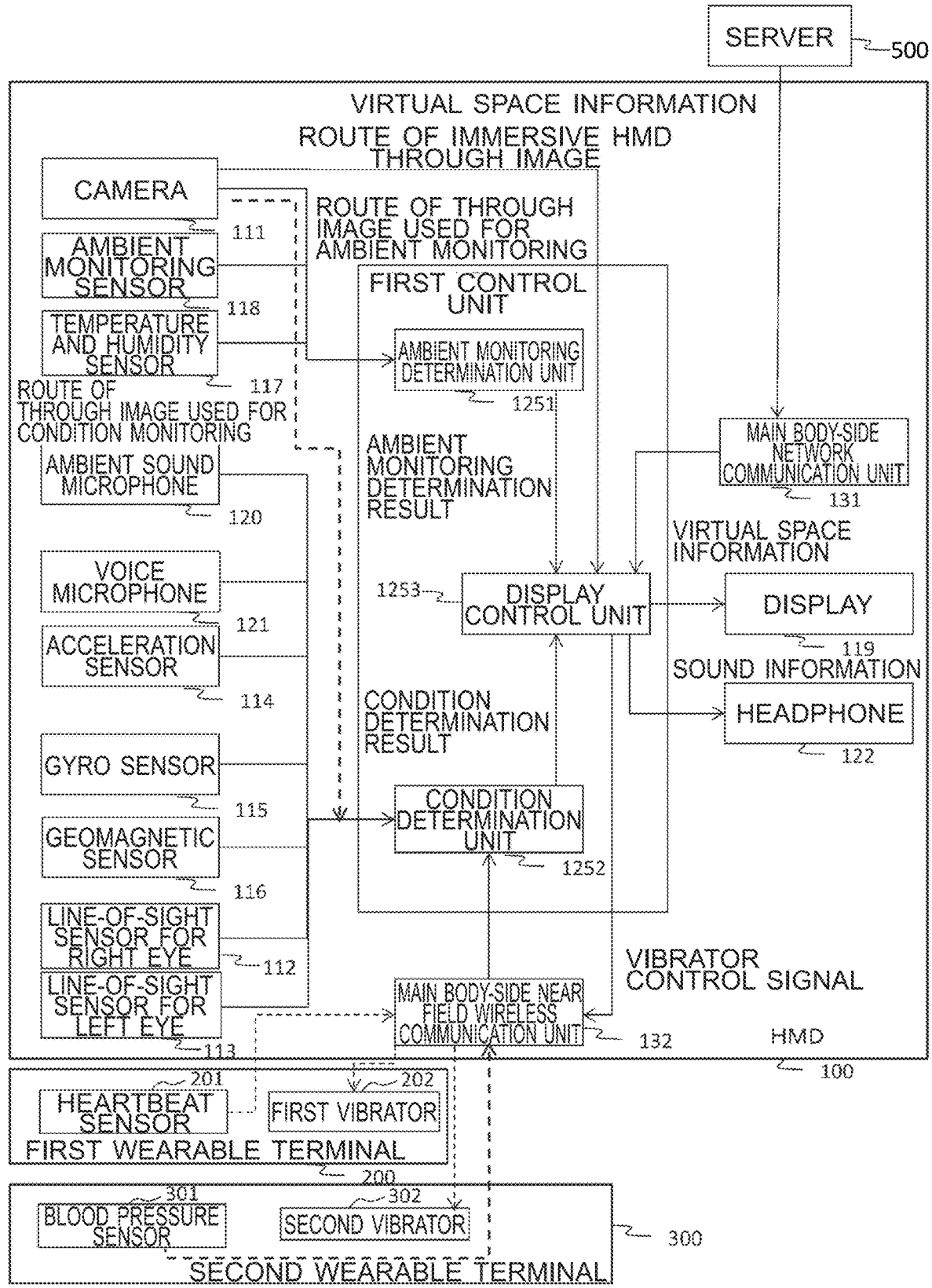
FIG. 3 is a functional block diagram illustrating functions of a main body-side control unit.

The first vibrator 202 is configured to generate vibration in response to a vibrator control signal (see FIG. 3). By being closely mounted to the user's chest, the first vibrator 202 can reliably transmit the generated vibration to the user. The notification information sent from the HMD 100 to the user is transmitted to the first vibrator 202 via the main body-side near field wireless communication unit 132 and the first near field wireless communication unit 203, and then converted by the first vibrator 202 into vibration to provide the user with the notification.

The second wearable terminal 300 includes the blood pressure sensor 301, a second vibrator 302, and a second near field wireless communication unit 303 (corresponding to a terminal-side communication unit). The blood pressure sensor 301 is wrapped around and mounted to the user's arm to accurately detect the user's blood pressure. The second near field wireless communication unit 303 transmits the detected blood pressure information to the HMD 100 by near field communication. At the HMD 100 side, the main body-side near field wireless communication unit 132 receives and acquires the transmitted blood pressure information.

The second vibrator 302 is configured to generate vibration in response to a vibrator control signal (see FIG. 3). By being wound around and mounted on the user's arm, the second vibrator 302 can reliably transmit the generated vibration to the user. The notification information sent from the HMD 100 to the user is transmitted to the second vibrator 302 via the main body-side near field wireless communication unit 132 and the second near field wireless communication unit 303, and converted by the second vibrator 302 into vibration to provide the user with the notification.

When the user's physical or ambient condition is not in the abnormal condition and thus the operation of superimposing display or replacement display of the virtual space information is started, or when the user's physical or ambient condition is in the abnormal condition and thus the operation of superimposing display or replacement display of the virtual space information is not started, each of the main body-side vibrator 124, the first vibrator 202, and the second vibrator 302 generates vibration for notifying the user that the operation of displaying the virtual space information is started or cannot be started. Similarly, a voice that notifies that the operation of displaying the virtual space information is started or cannot be started is issued from the headphone 122 to provide the user with the notification.

The input controller 400 includes an input operation unit 401 and a third near field wireless communication unit 402. The input operation unit 401 is an operation member such as a keyboard or a key button, to which the user can set and input information to be inputted.

The input operation unit 401 may be formed within a display screen of the display 119. For example, in the case of a touch pad type input member such as a capacitance type, an operation of approaching or contacting by the finger or a touch pen is detected as an operation input. The information inputted by the input operation unit 401 is transmitted to the HMD 100 via the third near field wireless communication unit 402, received by the main body-side near field wireless communication unit 132 of the HMD 100, and acquired by the HMD 100. In this connection, the case where each of the first wearable terminal 200, the second wearable terminal 300, and the input controller 400 transmits and receives the information to and from the HMD 100 conveniently by near field wireless communication has been described, meanwhile, they may be connected by wired communication.

The server 500 includes an image processor 501 (virtual space information generation processing unit), a server-side memory 502, a server-side control unit 503, a server-side network communication unit 504, and an antenna 505, which are mutually connected via a bus 506.

The image processor 501 is configured to generate the virtual space information expressing a virtual space different from the real space by images and sounds.

The server-side memory 502 is a flash memory or the like, and stores such as the virtual space information generated by the image processor 501 and the various programs used by the server-side control unit 503 of the server 500.

The server-side network communication unit 504 is a communication interface for communicating with the HMD 100 through the external network 600 via the antenna 505, and is connected to the HMD 100 to transmit and receive data therebetween.

The server-side control unit 503 is configured by a processor such as a CPU or an MPU, and controls each component by executing the programs 126 such as an OS (Operating System) and operation control application software stored in the server-side memory 502 so as to perform operation control processing of the entire server 500. Similarly to the main body-side control unit 125, the server-side control unit 503 may also be configured by a circuit.

The server-side control unit 503 is configured to control the operations of each component in response to a request from the HMD 100 to transmit and supply the virtual space information generated by the image processor 501 or the virtual space information stored in the server-side memory 502 to the HMD 100.

FIG. 3 is a functional block diagram illustrating functions of the main body-side control unit 125. The main body-side control unit 125 mainly includes an ambient monitoring determination unit 1251, a condition determination unit 1252, and a display control unit 1253. The details of the processing executed by each component will be described later with reference to FIG. 4 and FIG. 5.

Figure 4:
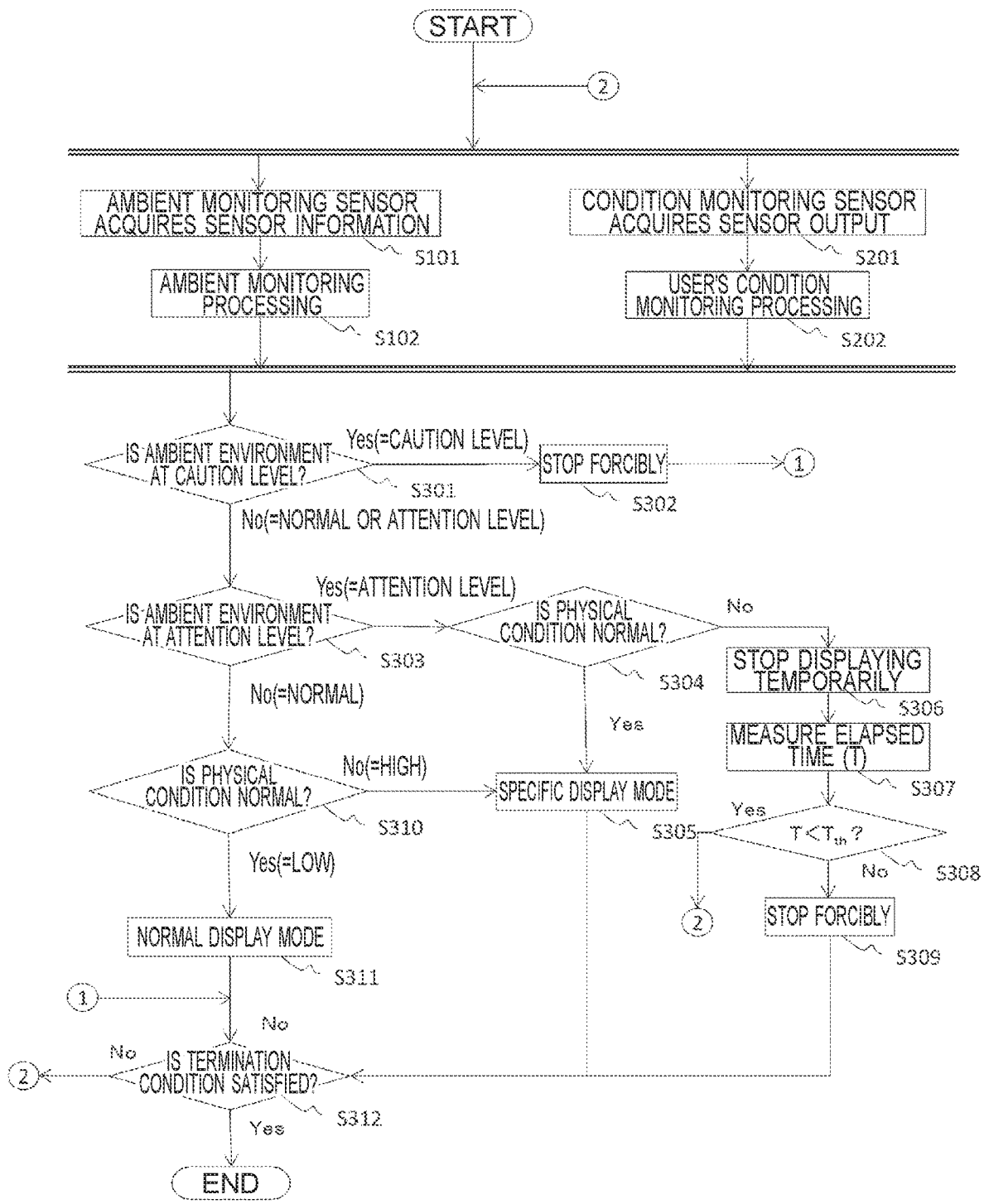
FIG. 4 illustrates a flowchart of processing of the head-mount display system.
Figure 5:
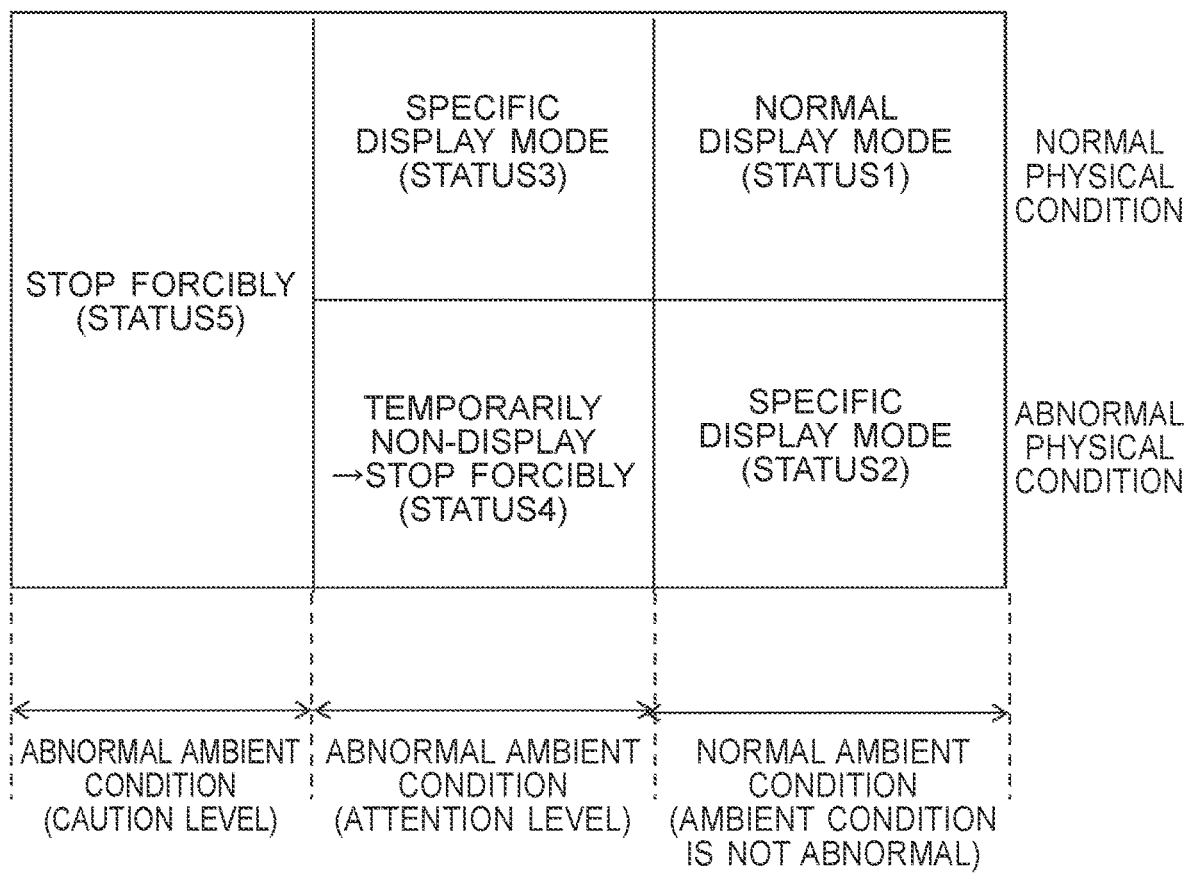
FIG. 5 illustrates types of display modes determined by a display control unit.

FIG. 4 illustrates a flowchart of the processing of the HMD system 1. FIG. 5 illustrates types of display modes determined by the display control unit 1253.

As illustrated in FIG. 4, when the main power of the HMD system 1 is turned on, ambient monitoring processing (step S101, step S102) and user's condition monitoring processing (step S201, step S202) are started in parallel.

Specifically, the ambient monitoring determination unit 1251 acquires a first sensor output indicating the real space information captured by the camera 111 and the position and movement of a surrounding object detected by the ambient monitoring sensor 118 (step S101) to determine whether a user's ambient condition is an abnormal condition that is dangerous to the user (step S102). The ambient monitoring determination unit 1251 outputs an ambient monitoring determination result to the display control unit 1253.

On the other hand, the condition determination unit 1252 acquires a second sensor output from each of the first wearable terminal 200 and the second wearable terminal 300 (step S201) to determine whether a user's physical condition is an abnormal condition in which the virtual space information is incorrectly recognized as the real space information by the user (step S202). In this context, the expression "user's physical condition is abnormal" means a condition in which the user's attention is decreased to such an extent that he or she incorrectly recognizes the virtual space information as the real space information, but does not mean a medical condition or a symptom such as a cold or a fracture.

The condition determination unit 1252 determines that the user's physical condition is abnormal, for example, when the user's blood pressure is not within a predetermined normal blood pressure range because it indicates low blood pressure or high blood pressure, or when the user's heart rate is not within a normal heart rate range because it is too low or too high. The condition determination unit 1252 outputs a user's physical condition determination result to the display control unit 1253.

The display control unit 1253 determines a display mode of the virtual space information by using both the ambient monitoring determination result and the user's physical condition determination result.

As illustrated in FIG. 5, the display control unit 1253 displays the virtual space information in the normal display mode when the user's physical condition is normal as well as the user's ambient condition is normal (Status 1), that is, displays the information in the display mode of the virtual space information with the image quality and color tone that are basically set in the HMD 100. In other words, in the normal display mode, the display control unit 1253 displays the virtual space information without elaborating special contrivance for allowing the user to distinguish the image and the scene of the real space from the virtual space information.

When the user's physical condition is abnormal but the user's ambient condition is normal (Status 2), or when the user's physical condition is normal but the user's ambient condition is abnormal at a level requiring attention (Status 3), the display control unit 1253 displays the information in a specific display mode.

The specific display mode is a mode for displaying the virtual space information by lowering its reality and making it clearly different from the real space information. In the specific display mode, it is possible for the user to be clearly aware that the displayed information is the virtual space information.

For example, the image processor 501 in the server 500 controls and adjust the image quality such as colors, brightness, contrasts, and resolutions of the virtual space information to be superimposed or replaced for display so as to make it clearly different from the image quality of the real space information captured by the camera 111 and thus detected, or the main body-side control unit 125 controls and adjusts the virtual space information stored in the memory 128 of the HMD 100 in the same manner as above.

For displaying the virtual space information, a transmission mode may be used, the number of polygons which are used in the curved surface representation of the object may be reduced, or only outlines may be highlighted. Furthermore, a message indicating that the virtual space information is being displayed may be displayed in parallel with the image 130 of the virtual space information. Still further, the virtual space information may be displayed with colors different from those in the normal display mode, or may be blinked and displayed.

The specific display mode may be displayed not only at the start of displaying the virtual space information, but also continuously displayed during displaying the virtual space information. In the specific display mode, the display reality of the virtual space information is lowered to make the user easily understand that it is a virtual space, whereby the user can be aware that the displayed information is the virtual space information at the start of display thereof and during displaying it.

When the user's physical condition is abnormal and the user's ambient condition is also abnormal at the level requiring attention (Status 4), the display control unit 1253 temporarily hides the virtual space information from the display 119. Then, when the user's physical condition is restored and becomes normal within a predetermined non-display standby time $T_{th}$ (transition from Status 4 to Status 3) or when the user's ambient condition becomes normal (transition from Status 4 to Status 2), the display control unit 1253 displays the virtual space information again in the specific display mode. When the elapsed time T after the Status 4 exceeds the non-display standby time $T_{th}$, the display control unit 1253 forcibly stops displaying the virtual space information.

When the user's ambient condition is abnormal at a level requiring caution (Status 5), the display control unit 1253 forcibly stops displaying the virtual space information regardless of whether the user's physical condition is normal or abnormal.

Returning to FIG. 4, the main body-side control unit 125 acquires the ambient monitoring determination result and the user's physical condition determination result to determine a display mode to be currently used. An example of the procedure for determining the display mode will be described below, meanwhile, the procedure for determining which display mode to be used is not limited to the example below.

When determining that the ambient environment is at the caution level based on the ambient monitoring determination result (step S301), the main body-side control unit 125 determines to forcibly stop displaying the virtual space information. The main body-side control unit 125 makes the display control unit 1253 forcibly stop the virtual space information (step S302: Status 5 in FIG. 5), and proceeds to step S312.

When displaying the virtual space information again, the user enters a redisplay input instruction from the input operation unit 401 of the input controller 400. In order to facilitate the operation of the redisplay input instruction, it may be configured to stop outputting the virtual space information at step S302 and display a redisplay icon on the display 119. The operations at steps S101, S201 may be resumed when the user touches the redisplay icon (corresponding to step S312/No).

When determining that the ambient environment is at the attention level based on the ambient monitoring determination result (step S301/No, step S303/Yes), the main body-side control unit 125 determines whether the user's physical condition is normal or abnormal based on the user's physical information determination result (step S304).

When the user's physical information is normal (step S304/Yes), the main body-side control unit 125 determines that the display mode of the virtual space information should be the specific display mode, and outputs an instruction for using the specific display mode to the display control unit 1253. The display control unit 1253 converts the virtual space information into display data for the specific display mode, and outputs it to the display 119 (step S305: Status 3 in FIG. 5).

When the user's physical information is abnormal (step S304/No), the main body-side control unit 125 temporarily stops displaying the virtual space information (step S306: Status 4 in FIG. 5), and the timer 133 measures the elapsed time T after temporarily stopping displaying the information (step S307). When the elapsed time T is less than the predetermined non-display standby time $T_{th}$ (step S308/Yes), the main body-side control unit 125 returns to steps S101, S201. When the elapsed time T exceeds the non-display standby time $T_{t}h$ as a result of repeating the processing (step S308/No), the main body-side control unit 125 forcibly stops displaying the information (step S309) and proceeds to step S312.

When determining that the ambient environment is normal based on the ambient monitoring determination result (step S303/No), the main body-side control unit 125 determines whether the user's physical condition is normal or abnormal based on the user's physical information determination result (step S310).

When the user's physical information is normal (step S310/Yes), the main body-side control unit 125 determines that the display mode of the virtual space information should be the normal display mode (step S311: Status 1 in FIG. 5), and outputs an instruction for using the normal display mode to the display control unit 1253. The display control unit 1253 converts the virtual space information into display data for the normal display mode, and outputs it to the display 119 (step S311).

When the user's physical information is abnormal (step S310/No), the main body-side control unit 125 determines that the display mode of the virtual space information should be the specific display mode (step S305: Status 2 in FIG. 5).

At the time of forcibly stopping displaying the virtual space information in steps S302, S309 or the case of temporarily hiding it in step S306, a message indicating that the virtual space information cannot be displayed may be displayed on the display 119 to notify it to the user, or may be notified to the user by a voice uttered from the headphone 122 or by tactile vibration to the user generated from at least one of the body-side vibrator 124, the first vibrator 202, and the second vibrator 302.

In addition, at the time of displaying the virtual space information in the specific display mode in step S305 or the normal display mode in step S311, a message indicating that the virtual space information is being displayed may be displayed on the display 119 to notify it to the user, or may be notified to the user by a voice uttered from the headphone 122 or by tactile vibration to the user generated from at least one of the body-side vibrator 124, the first vibrator 202, and the second vibrator 302.

Hereinafter, an example of determining whether there is a factor for decreasing the attention due to the user's physical condition and the ambient environment will be described.

<Example of Determining User's Physical Condition: Saccade Detection>

An example of using the line-of-sight sensor 112 for right eye and the line-of-sight sensor 113 for left eye as sensor devices used for determining the user's physical condition in steps S201, S202 will be described.

The main body-side control unit 125 acquires right eye line-of-sight data outputted from the line-of-sight sensor 112 for right eye and left eye line-of-sight data outputted from the line-of-sight sensor 113 for left eye to detect the movement of both eyes.

The condition determination unit 1252 of the main body-side control unit 125 is configured to identify whether rapid eye movement (saccade) in which both eyes move slightly and quickly is performed based on the right eye line-of-sight data of and the left eye line-of-sight data. When detecting the rapid eye movement, the condition determination unit 1252 determines that the user is in an abnormal condition in which the virtual space information is incorrectly recognized as the real space information by the user.

<Example of Determining User's Physical Condition: Detecting Whether User is Gazing at Object in Real Space>

Figure 6:
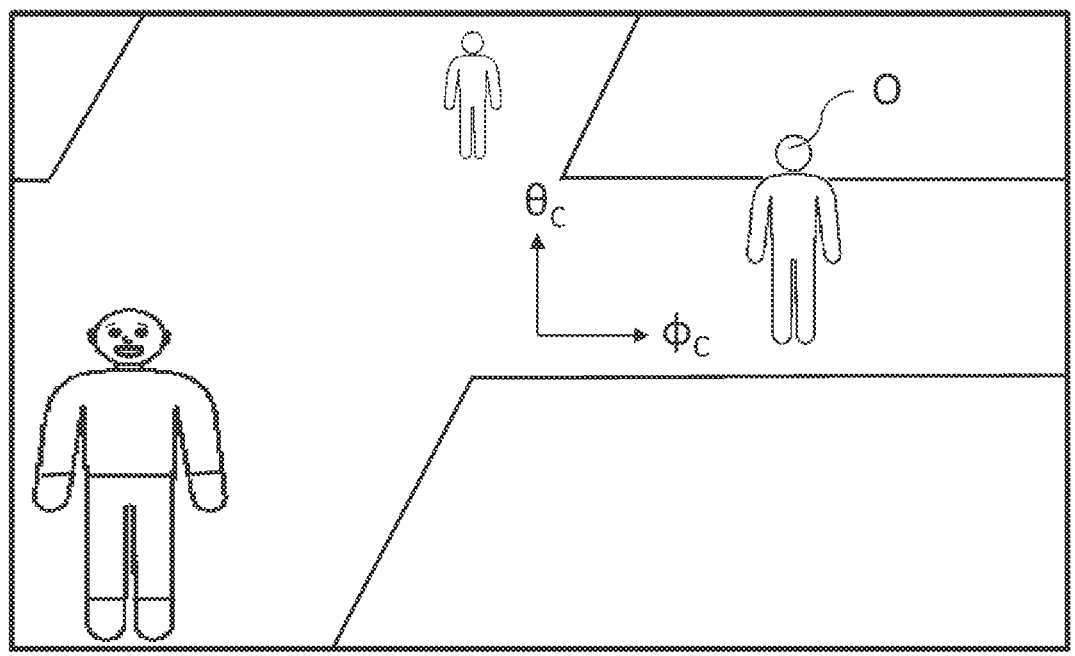
FIG. 6 illustrates a coordinate system when a real space is viewed from a camera.
Figure 7:
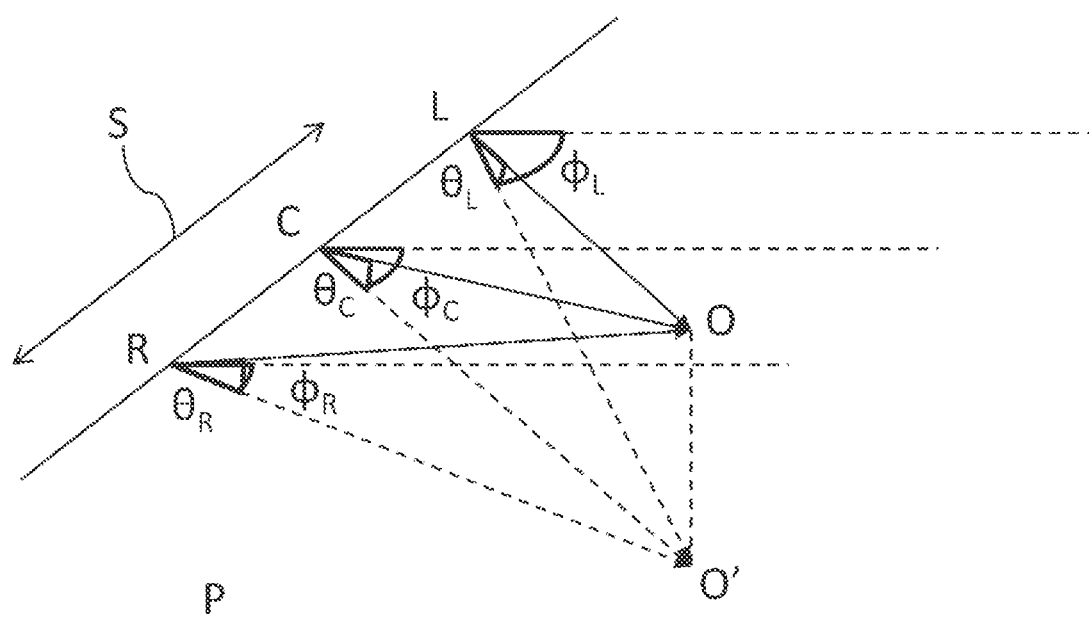
FIG. 7 illustrates a positional relationship between a subject at which a user is gazing and both eyes.

Another example of using line-of-sight detection is to determine the degree of the user's attention to the surroundings based on whether the user is gazing at a specific object in the real space. Here, gaze can be defined as a state in which the lines of sight are put on the object for a predetermined time period or longer. FIG. 6 illustrates a coordinate system when the real space is viewed from the camera 111. FIG. 7 illustrates a positional relationship between a subject O at which the user is gazing and both eyes.

Firstly, the condition determination unit 1252 acquires the real space information by the camera 111. The condition determination unit 1252 detects the user's lines of sight based on the right eye line-of-sight data and the left eye line-of-sight data. A position on the HMD 100 to which the camera 111 is mounted is fixed, and accordingly, when the user wears the HMD 100, the relative position of the eyeballs and the camera 111 is fixed. Here, it is assumed that the camera 111 is disposed near the midpoint of a line segment connecting between both eyes. The real space captured by the camera 111 is mapped on the coordinate system of the orientation ($\theta_0$, $\Phi_c$) viewed from the camera 111 (see FIG. 6). Which point in the image of the real space the user's lines of sight face can be calculated based on the right eye line-of-sight data and the left eye line-of-sight data as follows.

In FIG. 7, R represents the position of the right eye, and L represents the position of the left eye. The distance between the two eyes is referred to as S. C is the position of the camera 111, which is the midpoint of the baseline LR connecting between both eyes. Strictly, the position of the camera 111 deviates from the midpoint of the baseline. However, it is usual that the position of the subject is sufficiently far compared to the amount of the deviation above. Accordingly, when obtaining the direction of the subject as viewed from the camera 111, the deviation of the camera position can be ignored.

When considering the distance and direction to the subject, the reference plane P formed by the base line LR and the optical axis direction of the camera 111 is used. The angle formed by a vector from each point to the subject and the reference plane P is expressed by $\theta$, and the upper direction of the reference plane P is set as positive. Furthermore, an angle formed by a vector in which the vector from each point to the subject is projected on the reference plane P and the optical axis direction of the camera 111 is expressed by $\Phi$. When the reference plane P is viewed from above, the angle in the right direction is set as positive.

The direction of the subject ($\theta_L$, $\Phi_L$) and ($\theta_R$, $\Phi_R$) as respectively viewed from the left eye and the right eye can be measured by the line-of-sight sensors for left eye and right eye. Based on the data above, it is possible to calculate the direction of the gazed subject O ($\theta_c$, $\Phi_c$) as viewed from the camera 111 and the distance $d_{CO}$ from the camera 111 to the subject O. The followings are the specific equations.

[Equation 1]

$$\varphi_C = \tan^{-1}\left(\frac{1}{2}(\tan\varphi_L + \tan\varphi_R)\right) \quad (1)$$

[Equation 2]

$$\theta_C = \tan^{-1}\left(\frac{\cos\varphi_C}{2}\left(\frac{\tan\theta_L}{\cos\varphi_L} + \frac{\tan\theta_R}{\cos\varphi_R}\right)\right) \quad (2)$$

[Equation 3]

$$d_{CO} = \frac{S}{\cos\theta_C \cos\varphi_C (\tan\varphi_L - \tan\varphi_R)} \quad (3)$$

Since the distance to the gaze point can be obtained, if the camera 111 is provided with a distance measurement function to obtain the distance to the subject, it is possible to determine the gaze to the object more accurately (distance measurement device may be provided in addition to the camera).

When the user's gaze point remains on the same object in the real world for a predetermined time period or longer, it may be determined that the user is gazing at the object and thus the physical condition is abnormal based on the determination that the user's attention to the other surroundings is decreased. When the user is gazing at none of the objects, it may be determined that the physical condition is normal.

As a result, in a state where the user is watching the real space information, disturbance or interruption due to displaying the virtual space information does not occur, thereby making it possible to use the HMD 100 safely and conveniently.

<Example of Determining User's Physical Condition: Detecting Whether User has Closed his/her Eyes>

As another example using line-of-sight detection, the condition determination unit 1252 may be configured to detect the movement of both eyes by using the right eye line-of-sight data and the left eye line-of-sight data to determine whether the eyes are closed except for blinking.

When the eyes are closed except for blinking, the condition determination unit 1252 determines that the user's physical condition is abnormal, specifically at the caution level, and when the eyes are not closed except for blinking, determines that the user's physical condition is normal.

When the eyes are closed except for blinking and the user's attention is not concentrated, the virtual space information may not be displayed so as to increase the safety of the user. In this connection, in addition to the line-of-sight detection, the camera 111 may be used to detect a state in which the eyes are closed except for blinking.

<Example of Determining User's Physical Condition: Detecting Movement of Lines of Sight>

In addition, when the movement of the lines of sight of both eyes is not observed so much, the user may not have a clear consciousness because he or she feels drowsy, and thus may be in an absent-minded state. Accordingly, when the movement of the lines of sight within a predetermined time period is small and slow, the condition determination unit 1252 may determine that the user's the physical condition is abnormal, specifically at the caution level, since the possibility that the user's consciousness is absent cannot be denied.

When the user's physical condition is inappropriate and the user's consciousness is unclear, for example, when he or she gets motion sickness or is in a bad condition, the image 130 of the virtual space information may not be displayed so as to increase the safety of the user.

In the above, the case of controlling the display operation of the virtual space information by determining the presence or absence of the abnormal condition in the user's body based on the detected movement of the eyeballs has been described. Meanwhile, while the virtual space information is displayed, when the line-of-sight sensor 112 for right eye and the line-of-sight sensor 113 for left eye detect the movement of the eyeballs to identify and determine whether involuntary eye movement during fixation or following movement of the eyes toward the virtual space information is performed, and when it is determined that the user is not conscious of or is not aware of the virtual space information because the eyeballs do not capture the virtual space information, the virtual space information may be temporarily hidden (Status 4) or forcibly stopped (Status 5).

In such a case, as the information to be displayed for the user, only the real space information which has been recognized by the user is sufficient. Accordingly, by hiding the virtual space information which is not being recognized by the user, the advantageous effect that the head-mount display can be used in a safer state can be expected.

<Example of Detecting User's Physical Condition: Movement of Head>

In steps S201, S202, as sensor devices for detecting the user's physical condition, the acceleration sensor 114, the gyro sensor 115, and the geomagnetic sensor 116 may be used to detect the movement of the user's head so as to detect the user's physical condition.

In step S201, the condition determination unit 1252 acquires a sensor output which has been output from each of the acceleration sensor 114, the gyro sensor 115, and the geomagnetic sensor 116.

In step S202, the condition determination unit 1252 identifies whether the head moves greatly, and when at least one of the sensor outputs exceeds a movement determination threshold (acceleration threshold, angular velocity threshold, and geomagnetic change threshold) defined respectively for the type of each sensor outputs, the condition determination unit 1252 determines that the user's physical condition is the abnormal condition in which the virtual space information is incorrectly recognized as the real space information by the user.

On the other hand, when the head does not move greatly, specifically, all the sensor outputs are equal to or less than the movement determination threshold, the condition determination unit 1252 determines that there is no abnormality in the user's physical condition.

<Example of Detecting User's Physical Condition: Using Sound Information>

In step S201, the condition determination unit 1252 captures the sound by using the ambient sound microphone 120 and the voice microphone 121. In addition, the condition determination unit 1252 captures the movement of the eyeballs by using the line-of-sight sensor 112 for right eye and the line-of-sight sensor 113 for left eye.

In step S202, the condition determination unit 1252 identifies and determines where the user's consciousness is based on the captured sound and movement of the eyeballs. When determining that the user is viewing information that is different from the virtual space information, such as when he or she is having a conversation with a person or making a telephone call, the condition determination unit 1252 determines that the user's physical condition is abnormal. On the other hand, when determining that only the virtual space information is being viewed, the condition determination unit 1252 determines that the physical condition is normal.

<Example of Detecting Ambient Environment: Detecting Approaching Object>

The case of using the ambient monitoring sensor 118 as a sensor device for detecting the ambient environment condition will be described.

The ambient monitoring sensor 118 detects the distance and direction of the object around the user. Accordingly, in step S101, the ambient monitoring determination unit 1251 acquires the first sensor output including the distance and direction to the object existing around the user detected and outputted by the ambient monitoring sensor 118.

In step S202, the ambient monitoring determination unit 1251 identifies whether an object such as a car, human, or animal is approaching the user within a certain range based on the first sensor output outputted from the ambient monitoring sensor 118. When the object is approaching within the certain range, the ambient monitoring determination unit 1251 determines that the ambient environment condition is dangerous to the user upon displaying the virtual space information, in other words, when determining that the object is within a predetermined distance range, the ambient monitoring determination unit 1251 determines that the ambient environment is abnormal. When there is no object approaching within the distance range, the ambient monitoring determination unit 1251 determines that the ambient environment is normal. In the case where an object is approaching the user, the ambient environment may be particularly determined as the caution level.

With this configuration, when an object is approaching the user within the distance range from the user, the virtual space information can be displayed in the specific display mode or forcibly stopped, thereby preventing inconvenience from occurring under the situation where the virtual space information is displayed in an environment that is dangerous to the user. In addition, it is possible to notify the user viewing the virtual space information that the ambient environment has become abnormal.

<Example of Detecting Ambient Environment: Detecting Approaching Object>

The temperature and humidity around the user may be detected by using the temperature and humidity sensor 117 as a sensor device for detecting the user's ambient condition.

In step S101, the ambient monitoring determination unit 1251 acquires the sensor output including the temperature and humidity detected and outputted by the temperature and humidity sensor 117. The acquired temperature and humidity are temporarily stored in the memory 128.

In step S102, the ambient monitoring determination unit 1251 calculates change in the temperature and humidity stored in the memory 128, and when at least one of the events occurs, namely, when the change in the temperature exceeds a predetermined temperature change threshold or the change in the humidity exceeds a predetermined humidity change threshold, the ambient monitoring determination unit 1251 determines that there is an abnormality in the user's ambient environment. On the other hand, when the change in the temperature is equal to or less than the temperature change threshold and the change in the humidity is equal to or less than the predetermined humidity change threshold, the ambient monitoring determination unit 1251 determines that the user's ambient environment is normal.

The information above is not limited to the temperature and humidity. For example, an atmospheric pressure sensor or the ambient sound microphone 120 may be used as the ambient monitoring sensor 118 as long as it is able to detect the information of the user's ambient condition such as the atmospheric pressure or the ambient sound.

The operation and effect of the HMD system 1 according to the present embodiment will be described. Whether the user incorrectly recognizes the virtual space information as the real space information and the degree of the inconvenience when the user incorrectly recognizes the virtual space information differ depending on the combination of the user's physical condition and ambient environment.

Generally, when the user's physical condition is normal, it is considered that incorrect recognition of the virtual space information is unlikely to occur because the user's attention level is high.

Even if the user incorrectly recognizes the virtual space information as a result of the abnormality in the user's physical condition and decrease in his or her attention, in the case where the ambient environment is normal and safe, for example, in the case where the user is sitting on a sofa in a room and a cup on a table is being displayed as the virtual space information, even if the user incorrectly recognizes the cup as a cup in the real space, the degree of the inconvenience is low. On the other hand, if the user incorrectly recognizes the virtual space information while walking outdoors, a serious inconvenience such as stumbling or interfering with an object on a road may occur.

Furthermore, regardless of the user's physical condition, for example, when the user is in a state where a vehicle or bicycle is traveling toward the user while the user is walking outdoors, it is better to make the user leave the situation where the user's attention is caught by the virtual space information as soon as possible.

According to the HMD system 1 of the present embodiment, since the display mode of the virtual space information is determined by combining the normality and abnormality in both the user's physical condition and ambient environment, the occurrence of incorrect recognition of the virtual space information can be more suppressed and thus the usability of the HMD 100 can be improved as compared with the case of focusing on the user's physical condition only.

Furthermore, by dividing the levels of the ambient environment condition into the attention level and the caution level, the virtual space information is not immediately non-displayed even if there is an abnormality in the ambient environment. As a result, it is possible to balance between enjoying the display of the image 130 of the virtual space information and responding to the abnormality in the ambient environment.

When the user's physical condition is abnormal and the ambient environment is abnormal at the attention level (Status 4), the virtual space information display is temporarily stopped. Thereafter, if the abnormality at the attention level in the ambient environment is eliminated within the non-display standby time, the virtual space information can be displayed again in the specific display mode. Since the abnormality at the attention level may be eliminated in a short time period, in such a case, the virtual space information is displayed again to improve the usability of the HMD 100.

The present invention is not limited to the embodiment described above, and various modifications are included therein. The embodiment described above has been explained in detail in order to clarify the present invention, but is not necessarily limited to those having all the configurations described. In addition, a part of the configuration of the present embodiment can be replaced with that of another embodiment, and the configuration of another embodiment can be added to the configuration of the present embodiment. Furthermore, it is possible to add, delete, or replace another configuration with respect to a part of the configuration of the present embodiment.

For example, in the present embodiment, the server 500 includes the image processor 501 configured to generate virtual space information, and the generated virtual space information is received and displayed via the external network 600. Meanwhile, the image processor 501 may be incorporated into the HMD 100. With such a configuration, the virtual space information or the modified virtual space information may be displayed in the above-described display modes without communicating with the server 500.

Furthermore, the heartbeat sensor 201 in the first wearable terminal 200, the blood pressure sensor 301 in the second wearable terminal 300, and the input control unit 401 in the input controller 400 may be incorporated into the HMD 100. In such a case, the heartbeat sensor 201 is provided in close contact to the head to detect the heart rate. The blood pressure sensor 301 is also provided in close contact to the head to detect a blood pressure value in a head artery just under the scalp. The input operation unit 401 may be provided at a position where the user can easily perform an input operation in the HMD 100.

Alternatively, in order to acquire the input operation information, it may be configured that the user utters a voice expressing an input operation and the voice microphone 121 collects the uttered voice.

Still further, it may be configured to display an input operation screen on the display 119 to acquire the input operation information based on a position on the input operation screen at which the lines of sight detected from the right eye line-of-sight data and the left eye line-of-sight data are directed, or the input operation information may be acquired by displaying a pointer on the input operation screen which allows the user to designate the input operation by the movement of the hand or the like. By using utterance or displays for performing the input operation, it is possible to further improve the usability.

As described above, the first wearable terminal 200, the second wearable terminal 300, and the input controller 400 may be integrated, or only the image processor 501 may be incorporated into the HMD 100.

As a sensor for detecting the user's physical condition, sensors configured to acquire other biological information, such as a sweat sensor and a breathing sensor, may be used.

In the embodiment described above, the operation for identifying and determining the user's physical condition or the user's ambient condition by using various sensor devices to control displaying the virtual space information has been described. Meanwhile, the display control unit 1253 may be configured to provide the user's eyes with an intense light or flash two or more lights within the user's visual field when determining that the user is in either the Status 3 or the Status 4. Thereafter, based on the determination results from the ambient monitoring determination unit 1251 and the condition determination unit 1252, the display control unit 1253 may superimpose or replace the virtual space information to display it again after transitioning the current state to a wakeful state (Status 1 and Status 2) in which the brain is awake and conscious.

In the case where the user uses the HMD 100 to obtain a sense of immersion in games, movies, or the like, the display control of the virtual space information in accordance with the user's physical condition or the ambient environment may not be performed. In such a case, for example, whether the display control of the virtual space information should be performed may be set and input from the input controller 400.

Some or all the above-mentioned configurations, functions, processing units, processing means, etc. may be realized by hardware, for example, by designing them with an integrated circuit. In addition, the above-described configurations, functions, etc. may be implemented by software by interpreting and executing the programs 126 in which the processor realizes the respective functions. Information such as the programs 126, tables, and files which realizes various functions can be placed in recording devices such as a memory, a hard disk, and an SSD (Solid State Drive), or recording media such as an IC card, an SD card, and a DVD.

Still further, the control lines and the information lines which are considered to be necessary for the purpose of explanation are indicated herein, and not all the control lines and the information lines of actual products are necessarily indicated. It may be considered that almost all the configurations are actually connected to each other.

REFERENCE SIGNS LIST

1: HMD system
100: HMD
111: camera
112: line-of-sight sensor for right eye
113: line-of-sight sensor for left eye
114: acceleration sensor
115: gyro sensor
116: geomagnetic sensor
117: temperature and humidity sensor
118: ambient monitoring sensor
119: display
120: ambient sound microphone
121: voice microphone
122: headphone
124: main body-side vibrator
125: main body-side control unit
126: programs
127: information data
128: memory
129: antenna
130: image
131: main body-side network communication unit
132: main body-side near field wireless communication unit
133: timer
140: bus
200: first wearable terminal
300: second wearable terminal
400: input controller
500: server
600: external network

The invention claimed is:
1. A head-mount display system comprising:
a head-mount display; and
a wearable terminal, the head-mount display and the wearable terminal being connected to each other for performing communication,
wherein the head-mount display includes:
a display that displays virtual space information;
an ambient monitoring sensor configured to monitor an ambient environment of the head-mount display;
a main body-side communication unit; and
a main body-side control unit connected to each of the display, the ambient monitoring sensor, and the main body-side communication unit, which is configured to determine a display mode for displaying the virtual space information on the display,
wherein the wearable terminal includes:
a condition monitoring sensor configured to monitor biometric information of a user wearing the head-mount display; and a wireless communication unit configured to transmit a
sensor output outputted from the condition monitoring
sensor to the main body-side communication unit,
wherein the main body-side control unit includes a timer,
and
wherein the main body-side control unit is further configured to:
acquire a first sensor output outputted from the ambient
monitoring sensor configured to monitor the ambient
environment of the head-mount display to determine
presence or absence of an abnormality in the ambient
environment;
receive, from the wearable terminal, a second sensor
output outputted from the condition monitoring sensor
to determine presence or absence of a factor of decreasing attention due to a user's condition;
determine the display mode at a time of displaying the
virtual space information on the display based on both
the presence or absence of the abnormality in the
ambient environment and the factor of decreasing
attention due to the user's condition;
display the virtual space information on the display in the
display mode as determined;
in determination of the display mode at a time of displaying the virtual space information on the display, only
when determining the absence of the abnormality and
also the absence of the factor of decreasing attention
due to the user's condition, display the virtual space
information on the display in a normal display mode;
divide levels of the abnormality occurring in the ambient
environment into an attention level in which a degree of
the abnormality is relatively low and a caution level in
which the degree of the abnormality is relatively higher
than that of the attention level;
at least one of when determining that the abnormality
occurring in the ambient environment is the attention
level and when determining the presence of the factor
of decreasing attention due to the user's condition,
display the virtual space information in a specific
display mode different from the normal display mode
or hide the virtual space information;
temporarily stop displaying the virtual space information
when determining that the abnormality occurring in the
ambient environment is the attention level and also
determining the presence of the factor of decreasing
attention due to the user's condition;
measure an elapsed time after temporarily stopping displaying the virtual space information by using the
timer,
restart displaying the virtual space information in a case
where the elapsed time, from a temporary stop of
displaying the virtual space information to determining
that the abnormality occurring in the ambient environment is eliminated or to determining that the factor of
decreasing attention due to the user's condition is
eliminated, is within a predetermined non-display
standby time;
forcibly stop displaying the virtual space information in a
case where determining that neither the abnormality
occurring in the ambient environment nor the factor of
decreasing attention due to the user's condition is
eliminated after the elapsed time exceeds the predetermined non-display standby time; and
display a message indicating that the virtual space information cannot be displayed at the time of forcibly
stopping displaying the virtual space information.

2. The head mount display according to claim 1,
wherein the controller is further configured to forcibly
stop displaying the virtual space information when
determining that the abnormality occurring in the ambient environment is the caution level regardless of
whether the factor of decreasing attention due to the
user's condition is absent or present.

3. The head-mount display according to claim 1,
wherein the specific display mode is configured for at
least one of:
displaying the virtual space information at a resolution
lower than a resolution in the normal display mode;
displaying the virtual space information in a display color
different from a display color in the normal display
mode;
blinking and displaying the virtual space information;
highlighting and displaying an outline of the virtual space
information; and
displaying a message indicating that the virtual space
information is being displayed in parallel with the
virtual space information.

4. The head-mount display according to claim 1,
wherein the controller is further configured to restart
displaying the virtual space information when a redisplay instruction is inputted by the user after forcibly
stopping displaying the virtual space information.

5. A head-mount display comprising:
a display that displays virtual space information; and
a controller connected to the display, which is configured
to determine a display mode for displaying the virtual
space information on the display,
wherein the controller includes a timer, and
wherein the controller is further configured to:
acquire a first sensor output outputted from an ambient
monitoring sensor configured to monitor an ambient
environment of the head-mount display to determine
presence or absence of an abnormality in the ambient
environment;
acquire a second sensor output outputted from a condition
monitoring sensor configured to monitor biometric
information of a user wearing the head-mount display
to determine presence or absence of a factor of decreasing attention due to a user's condition;
determine the display mode at a time of displaying the
virtual space information on the display based on both
the presence or absence of the abnormality in the
ambient environment and the factor of decreasing
attention due to the user's condition;
display the virtual space information on the display in the
display mode as determined;
in determination of the display mode at a time of displaying the virtual space information on the display, only
when determining the absence of the abnormality and
also the absence of the factor of decreasing attention
due to the user's condition, display the virtual space
information on the display in a normal display mode;
divide levels of the abnormality occurring in the ambient
environment into an attention level in which a degree of
the abnormality is relatively low and a caution level in
which the degree of the abnormality is relatively higher
than that of the attention level;
at least one of when determining that the abnormality
occurring in the ambient environment is the attention
level and when determining the presence of the factor
of decreasing attention due to the user's condition,
display the virtual space information in a specific
display mode different from the normal display mode
or hide the virtual space information;

temporarily stop displaying the virtual space information when determining that the abnormality occurring in the ambient environment is the attention level and also determining the presence of the factor of decreasing attention due to the user's condition;

simultaneously measure an elapsed time after temporarily stopping displaying the virtual space information by using the timer;

restart displaying the virtual space information in a case where the elapsed time, from a temporary stop of displaying the virtual space information to determining that the abnormality occurring in the ambient environment is eliminated or to determining that the factor of decreasing attention due to the user's condition is eliminated, is within a predetermined non-display standby time;

forcibly stop displaying the virtual space information in a case where determining that neither the abnormality occurring in the ambient environment nor the factor of decreasing attention due to the user's condition is eliminated after the elapsed time exceeds the predetermined non-display standby time; and display a message indicating that the virtual space cannot be displayed at the time of forcibly stopping displaying the virtual space information.

6. The head mount display according to claim 5, wherein the controller is further configured to forcibly stop displaying the virtual space information when determining that the abnormality occurring in the ambient environment is the caution level regardless of whether the factor of decreasing attention due to the user's condition is absent or present.

7. The head-mount display according to claim 5, wherein the specific display mode is configured for at least one of:
displaying the virtual space information at a resolution lower than a resolution in the normal display mode;
displaying the virtual space information in a display color different from a display color in the normal display mode;
blinking and displaying the virtual space information;
highlighting and displaying an outline of the virtual space information; and
displaying a message indicating that the virtual space information is being displayed in parallel with the virtual space information.

8. The head-mount display according to claim 5, wherein the controller is further configured to restart displaying the virtual space information when a redisplay instruction is inputted by the user after forcibly stopping displaying the virtual space information.

9. A head-mount display comprising:
a display that displays virtual space information;
an ambient monitoring sensor configured to monitor an ambient environment of the head-mount display;
a condition monitoring sensor configured to monitor biometric information of a user wearing the head-mount display; and
a controller connected to the display, which is configured to determine a display mode for displaying the virtual space information on the display,
wherein the controller includes a timer, and
wherein the controller is further configured to:
acquire a first sensor output outputted from the ambient monitoring sensor configured to monitor an ambient environment of the head-mount display to determine presence or absence of an abnormality in the ambient environment;

acquire a second sensor output outputted from the condition monitoring sensor configured to monitor biometric information of a user wearing the head-mount display to determine presence or absence of a factor of decreasing attention due to a user's condition;

determine the display mode at a time of displaying the virtual space information on the display based on both the presence or absence of the abnormality in the ambient environment and the factor of decreasing attention due to the user's condition;

display the virtual space information on the display in the display mode as determined;

in determination of the display mode at a time of displaying the virtual space information on the display, only when determining the absence of the abnormality and also the absence of the factor of decreasing attention due to the user's condition, display the virtual space information on the display in a normal display mode;

divide levels of the abnormality occurring in the ambient environment into an attention level in which a degree of the abnormality is relatively low and a caution level in which the degree of the abnormality is relatively higher than that of the attention level;

at least one of when determining that the abnormality occurring in the ambient environment is the attention level and when determining the presence of the factor of decreasing attention due to the user's condition, display the virtual space information in a specific display mode different from the normal display mode or hide the virtual space information;

temporarily stop displaying the virtual space information when determining that the abnormality occurring in the ambient environment is the attention level and also determining the presence of the factor of decreasing attention due to the user's condition;

measure an elapsed time after temporarily stopping displaying the virtual space information by using the timer;

restart displaying the virtual space information in a case where the elapsed time, from a temporary stop of displaying the virtual space information to determining that the abnormality occurring in the ambient environment is eliminated or to determining that the factor of decreasing attention due to the user's condition is eliminated, is within a predetermined non-display standby time;

forcibly stop displaying the virtual space information in a case where determining that neither the abnormality occurring in the ambient environment nor the factor of decreasing attention due to the user's condition is eliminated after the elapsed time exceeds the predetermined non-display standby time; and display a message indicating that the virtual space information cannot be displayed at the time of forcibly stopping displaying the virtual space information.

10. The head mount display according to claim 9, wherein the controller is further configured to forcibly stop displaying the virtual space information when determining that the abnormality occurring in the ambient environment is the caution level regardless of whether the factor of decreasing attention due to the user's condition is absent or present.

11. The head-mount display according to claim 9,
wherein the specific display mode is configured for at least one of:
displaying the virtual space information at a resolution lower than a resolution in the normal display mode;
displaying the virtual space information in a display color different from a display color in the normal display mode;
blinking and displaying the virtual space information;
highlighting and displaying an outline of the virtual space information; and
displaying a message indicating that the virtual space information is being displayed in parallel with the virtual space information.

12. The head-mount display according to claim 9,
wherein the controller is further configured to restart displaying the virtual space information when a redisplay instruction is inputted by the user after forcibly stopping displaying the virtual space information.

\* \* \* \* \*